(12) United States Patent
Kirik, Jr.

(10) Patent No.: US 6,195,865 B1
(45) Date of Patent: Mar. 6, 2001

(54) METHOD FOR SHRINK-FITTING FIRE HOSE

(75) Inventor: Michael Kirik, Jr., Union City, PA (US)

(73) Assignee: Snap-Tite Technologies, Inc., Wilmington, DE (US)

( * ) Notice: Subject to any disclaimer, the term of this patent is extended or adjusted under 35 U.S.C. 154(b) by 254 days.

(21) Appl. No.: 08/782,151

(22) Filed: Jan. 13, 1997

(51) Int. Cl.$^7$ ...................................................... B23P 11/00
(52) U.S. Cl. ............................................ 29/447; 29/402.21
(58) Field of Search ................................ 29/447, 402.21; 264/229, 230; 285/381.1, 381.4; 219/528

(56) References Cited

U.S. PATENT DOCUMENTS

| | | | |
|---|---|---|---|
| 3,159,402 | * | 12/1964 | Nichols ................................ 29/447 X |
| 3,382,121 | * | 5/1968 | Sherlock ............................ 264/229 X |
| 3,393,297 | * | 7/1968 | Hart ....................................... 219/528 |
| 3,567,259 | * | 3/1971 | Benson et al. ...................... 29/447 X |
| 4,131,788 | * | 12/1978 | Fulbrook ............................ 219/528 X |
| 4,169,477 | * | 10/1979 | Bokros ................................. 29/447 X |
| 4,288,107 | * | 9/1981 | Schwartze ..................... 285/381.4 X |
| 4,578,855 | * | 4/1986 | Van Der Hagen ...................... 29/447 |
| 4,664,423 | * | 5/1987 | Rowley ............................... 29/447 X |
| 5,009,730 | * | 4/1991 | Tozier ............................... 264/230 X |
| 5,507,532 | * | 4/1996 | Mitsui ........................... 285/381.1 X |
| 5,714,738 | * | 2/1998 | Hauschulz et al. .............. 219/528 X |

FOREIGN PATENT DOCUMENTS

WO 93/17272 * 9/1993 (WO) ................. 285/381.1

* cited by examiner

*Primary Examiner*—S. Thomas Hughes
(74) *Attorney, Agent, or Firm*—Woodling, Krost & Rust

(57) ABSTRACT

Nylon reinforced or polyester reinforced fire hose is secured to a coupling or shank by heating the fire hose to at least 270° F. with a wrap-around electric heating apparatus. The heating apparatus heats the fire hose for the period of time necessary to shrink fit the fire hose to the coupling or shank. Shrink fitting the fire hose to the coupling eliminates pinching of the fire hose and prevents leakage.

6 Claims, 8 Drawing Sheets

METHOD FOR SHRINK-FITTING FIRE HOSE

FIELD OF THE INVENTION

This invention relates to a fire hose which is secured to a coupling or a shank. In particular, this invention relates to fire hose that is oversized with respect to its coupling or shank. Oversized hoses cause leaks. Specifically, the leaks are caused by pinching of the fire hose with respect to the coupling. The pinching is caused as there is more material than is needed to fit around the circumference of the exterior of the coupling.

BACKGROUND OF THE INVENTION

Bokros U.S. Pat. No. 4,169,477, entitled Anastomatic Couplings, discloses a polymeric material which is heated to 250–300° F. and shrinks about a vascular graft to hold the graft on a prosthesis. U.S. Pat. No. 5,388,321 to Farrell discloses a hot air chamber to shrink tubing about a hose. Farrell discloses polyolefin as one material from which the heat-shrinkable material is made. U.S. Pat. No. 4,141,576 to Lupke et. al. discloses a heat-shrinkable sleeve made of a thermoplastic material having an unstable state. Similarly, U.S. Pat. No. 3,588,150 to Wold discloses a heat-shrinkable material. U.S. Pat. No. 2,027,962 to Currie and U.S. Pat. No. 3,086,242 to Cook et. al. disclose vinyl compounds and cross-link polymers as materials that can be used in heat-shrinking processes. U.S. Pat. No. 5,033,775 to Mattie et. al. discloses Polymer hoses which are heated and then cooled to effect the shrinking of the hose.

None of the related art, however, is directed toward heat-shrinking a nylon reinforced fire hose or a polyester reinforced fire hose or a combination nylon/polyester reinforced fire hose about a coupling or a shank.

SUMMARY OF THE INVENTION

The present invention discloses a nylon reinforced or a polyester reinforced fire hose which is secured to a coupling or shank by heating a fire hose to at least 270° F. with a wrap around heating apparatus. The heating apparatus heats the fire hose for the period of time necessary to shrink the fire hose to the coupling or shank. Shrink-fitting the fire hose to the coupling eliminates pinching of the fire hose and leakage.

It is well known in the fire-fighting industry that fire hose is not always sized perfectly to fit over a coupling or shank. Particularly, the inside diameter of the fire hose is usually considerably larger than the exterior diameter of the coupling or shank. The mismatch between the inside diameter of the fire hose and the outside diameter of the coupling or shank can be nearly two hundred thousandths of an inch (0.200 inches). Thus, the need for a fitting method is apparent.

When fire hose is destroyed in the field, for instance, by falling timbers which burn or rip the hose, it is necessary to reuse that hose by removing the damaged portion of the hose and fitting the still usable portion of the hose to a coupling or shank. Hose that has been in service for some time tends to enlarge. The method disclosed and claimed herein is directed toward resizing damaged hose and sizing a new hose.

Accordingly, it is an object of the present invention to provide a method whereby fire hose containing nylon reinforcement, polyester reinforcement or a combination nylon/polyester reinforcement can be fitted to a coupling or shank such that leakage is prevented. The present invention comprises the steps of placing a portion of the nylon or polyester reinforced fire hose over a coupling, wrapping the outer surface of the fire hose over the coupling with a heating apparatus, securing the heating apparatus over the fire hose, heating the fire hose with the heating apparatus to at least 270° F. until the fire hose over the coupling engages the coupling, removing the heating apparatus from the fire hose, and sealing the fire hose against the coupling.

It is the further object of the present invention to provide a method comprising the steps of placing a fire hose over a coupling, and heating the fire hose to a temperature between 270–300° F. until the fire hose shrinks to engage the coupling.

BRIEF DESCRIPTION OF THE DRAWINGS

FIG. 2 illustrates gaps between the coupling or shank and the fire hose caused by pinching of the fire hose due to the oversize nature of the fire hose.

FIG. 5 also illustrates a cross-section of the heating apparatus wrapped around the fire hose.

DETAILED DESCRIPTION OF THE INVENTION

Figure 1:
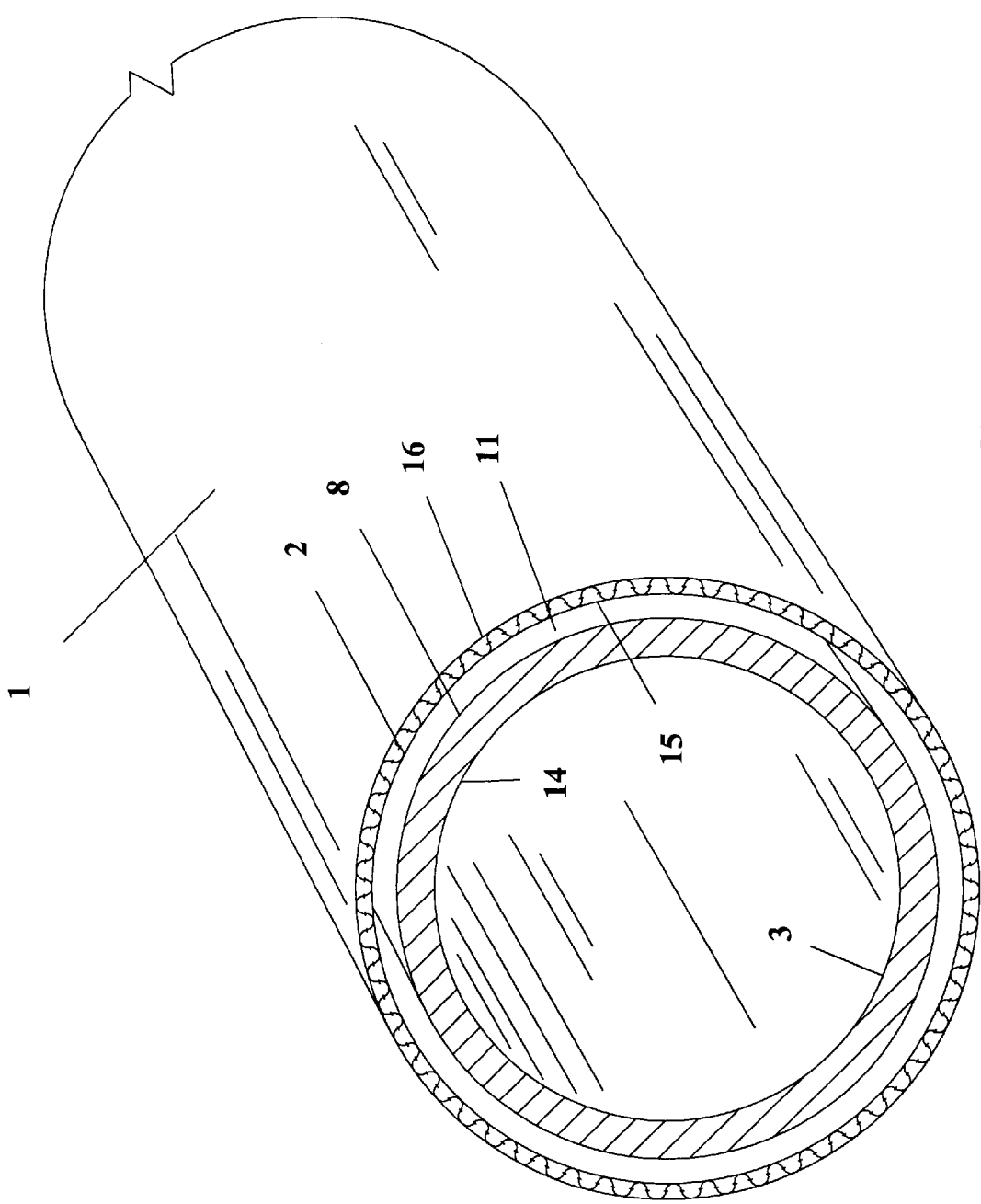
FIG. 1 illustrates the coupling with the nylon or polyester reinforced fire hose placed around the coupling. The flange of the coupling is not shown.

FIG. 1 illustrates the nylon reinforced fire hose 1. It has been discovered that nylon reinforced fire hose or polyester reinforced fire hose or a combination nylon/polyester reinforced fire hose shrinks upon the application of a heating jacket placed around the fire hose. The heating jacket is a commercially available jacket made by Watt Low located in Columbia, Mo. The heating jacket is very similar to the heating jackets employed to bend PVC pipe.

FIG. 1 further illustrates a gap 11 which exists between the fire hose 1 and the coupling or shank 3. As used herein, coupling and shank are used somewhat synonymously. A coupling is a device which enables two halves to be joined by way of the coupling. A shank is a coupling of soils, however, it is more of a male protrusion which may be fixedly mounted to another device and, therefore, can not be considered as a coupling half. The gap 11 illustrated in FIG. 1 is typically on the order of as much as two hundred thousandths of an inch (0.2000 inches).

Figure 2:
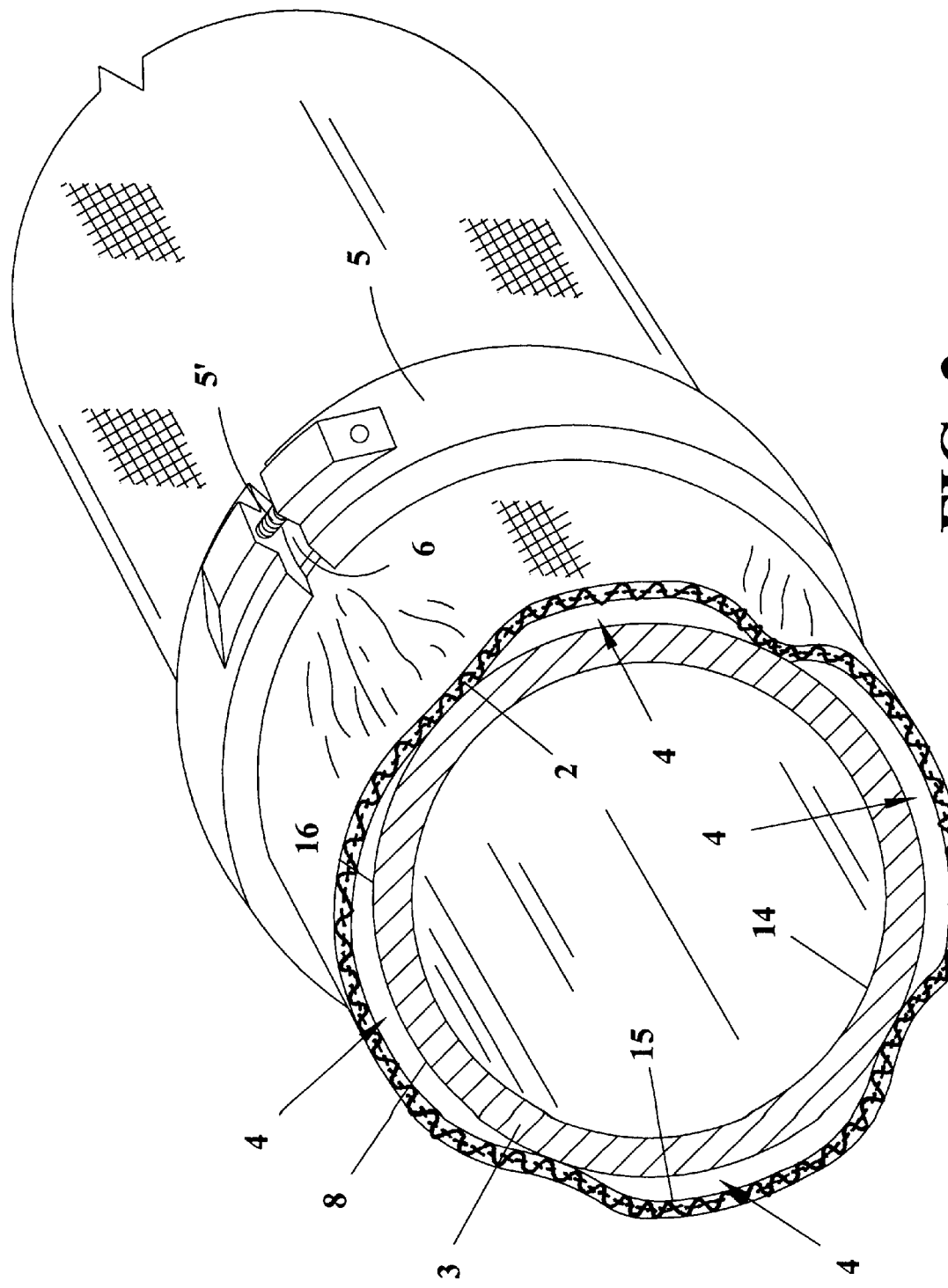
FIG. 2 illustrates the prior art.
Figure 2A:
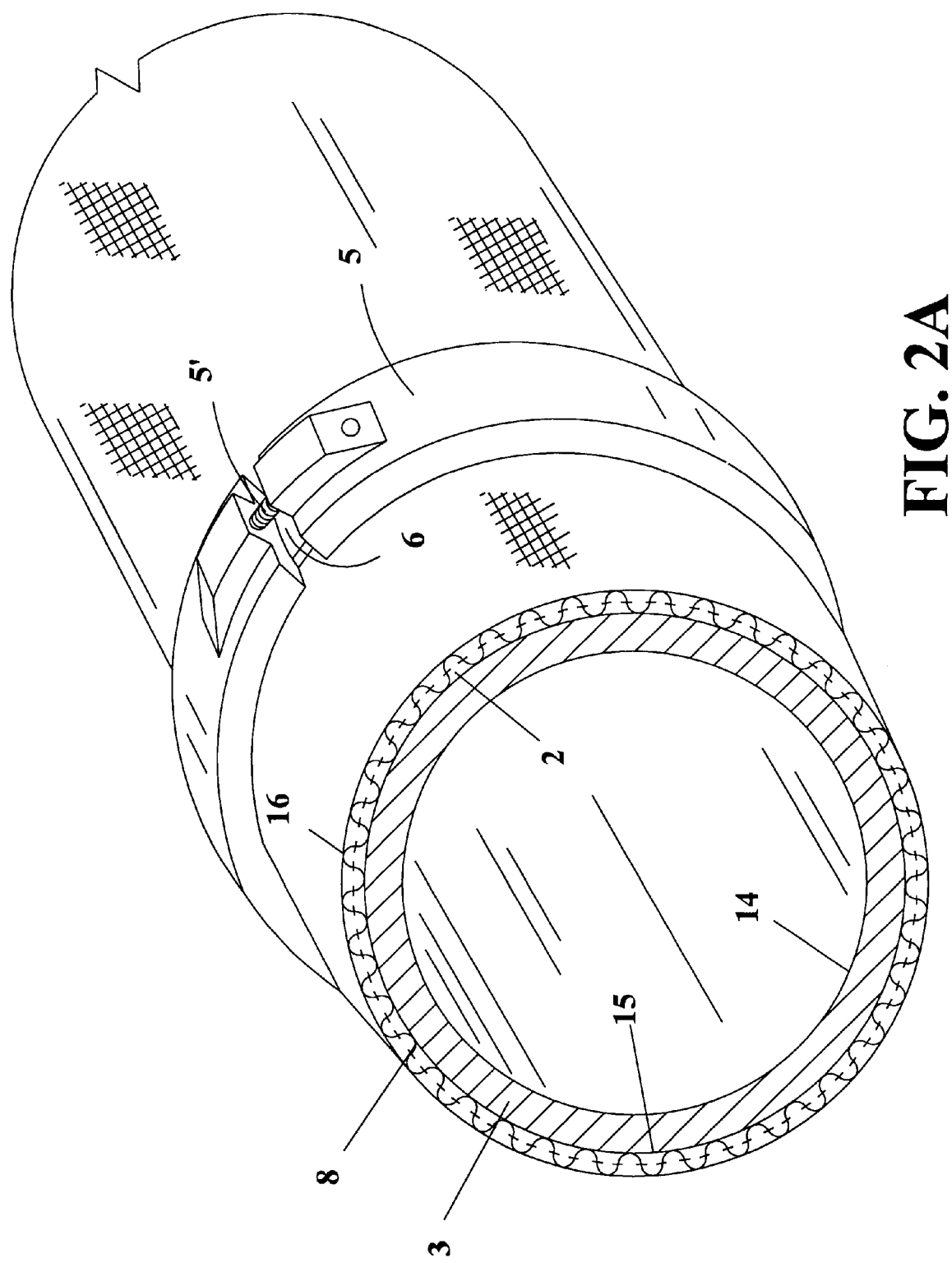
FIG. 2A illustrates the fire hose secured about the coupling without any gaps between the coupling and the fire hose. This drawing illustrates the result of the process disclosed by this application.

FIG. 2 illustrates the prior art. Essentially the prior art discloses an oversized fire hose which is clamped by way of clamp 5 to the coupling 3. Clamp 5 typically includes an insert 6 which provides a continuous surface which engages the fire hose and secures it to the circumference of the coupling 3. Clamp 5 includes a threaded member 5' which adjusts the tension of the clamp. However, it has been found that clamp 5 cannot be tightened enough to prevent leakage of the assembly shown in the prior art.

FIGS. 1 and 2 illustrate the coupling having an inner surface 14 and an outer surface 8. Additionally, FIGS. 1 and 2 illustrate the fire hose 1 having an inner surface 15 and an outer surface 16. FIG. 2, the prior art, illustrates large gaps 4 between the coupling 3 and the hose 1. Reference numeral 2 illustrates the nylon and/or polyester fibers contained in the hose. Referring again to FIG. 2, several gaps 4 are seen which appear due to the oversized nature of the fire hose.

Figure 3:
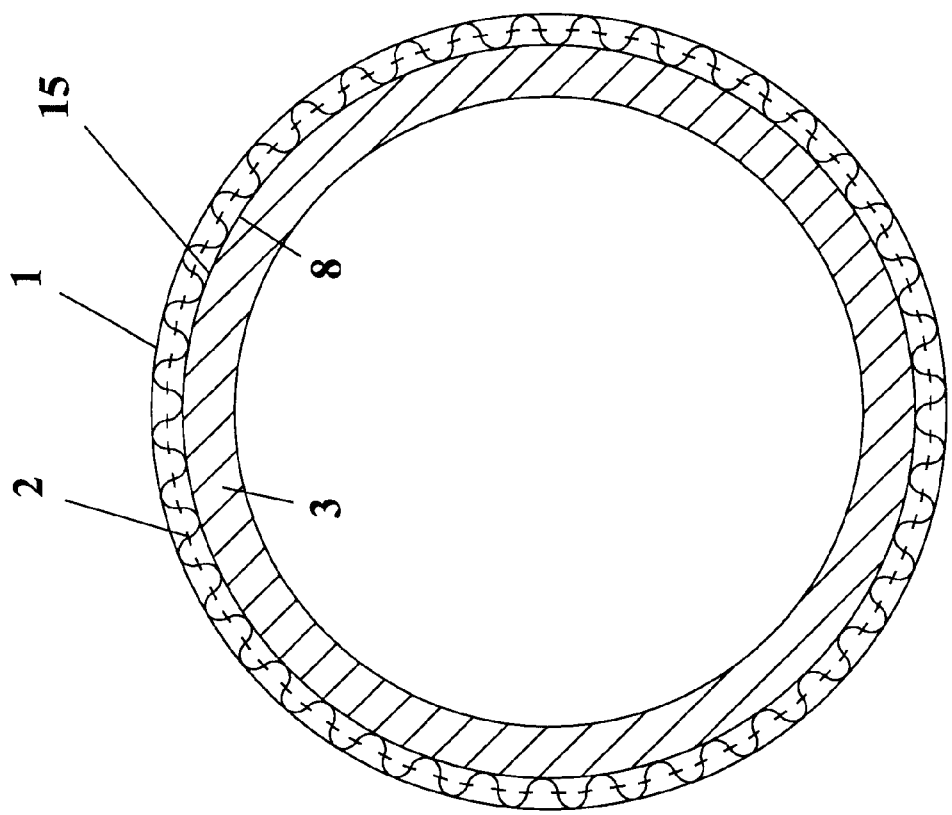
FIG. 3 illustrates the coupling and the fire hose after it has been shrunk to fit the coupling.

FIGS. 2' and 3 illustrate the fit of the fire hose to the coupling 3. In particular, when viewing FIG. 3, which is a cross-sectional view of the coupling and the fire hose, no gaps can be seen as the fire hose 1 has been shrunk fit to the coupling 3 by the process disclosed and claimed. As illustrated in FIG. 3, the inner surface 15 of the fire hose 1 is illustrated as being the same line as the outer surface 13 of coupling 3.

Figure 4:
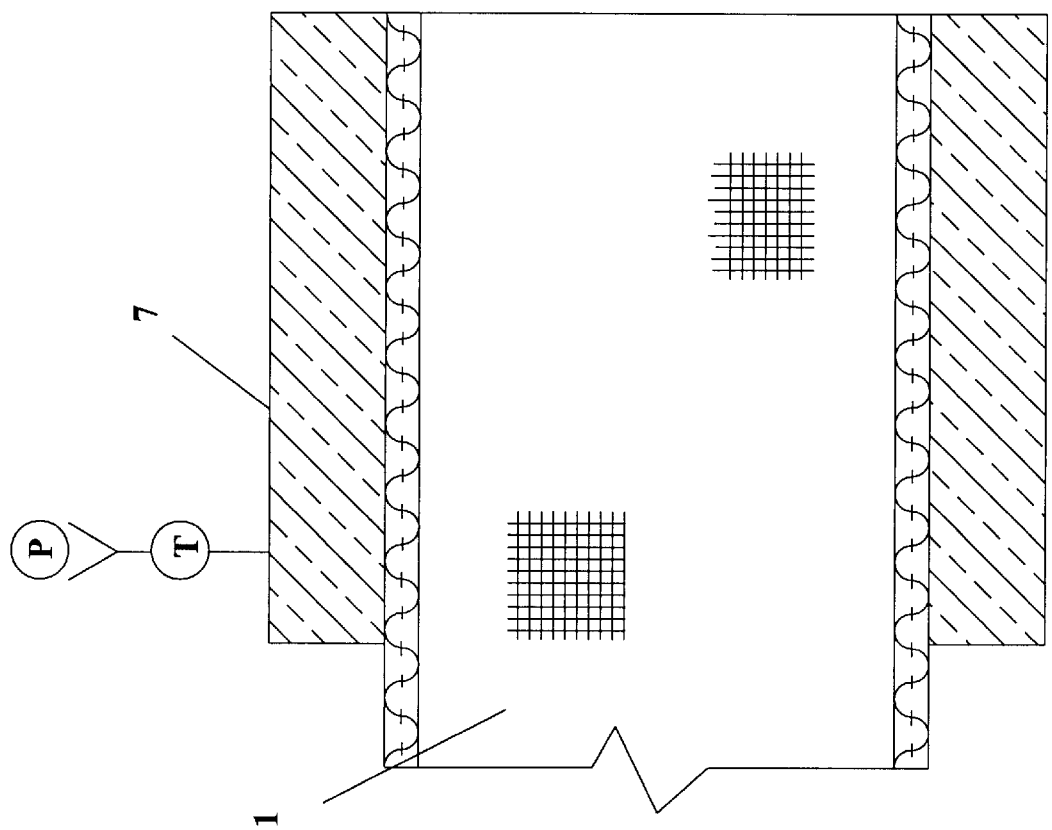
FIG. 4 illustrates a cross-sectional view of the heating apparatus of the preferred embodiment positioned around a nylon or polyester reinforced fire hose.
Figure 6:
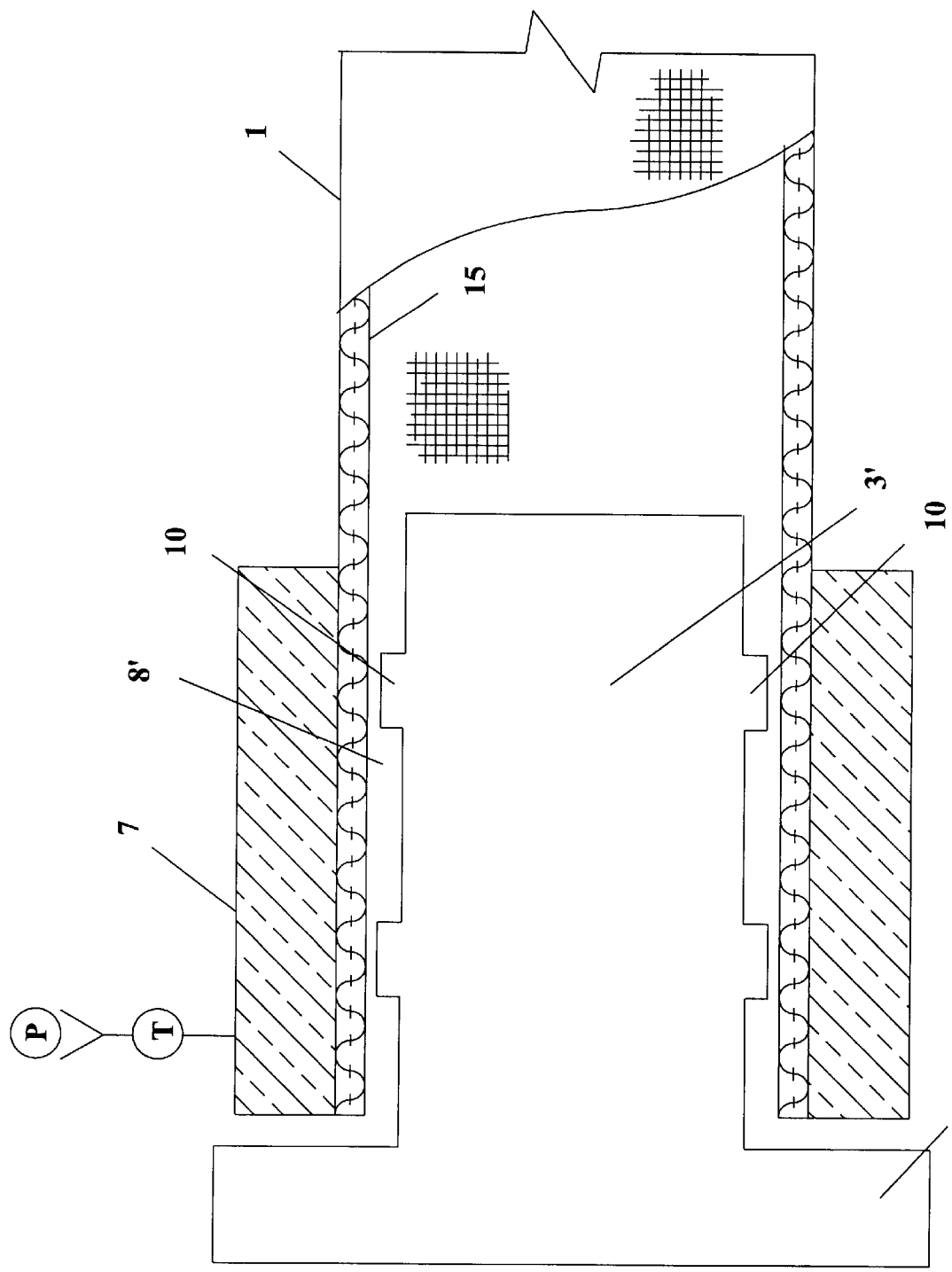
FIG. 6 illustrates a view similar to that of FIG. 5 with the exception that another type of shank is used. Particularly, the shank shown in FIG. 6 includes raised portions.
Figure 7:
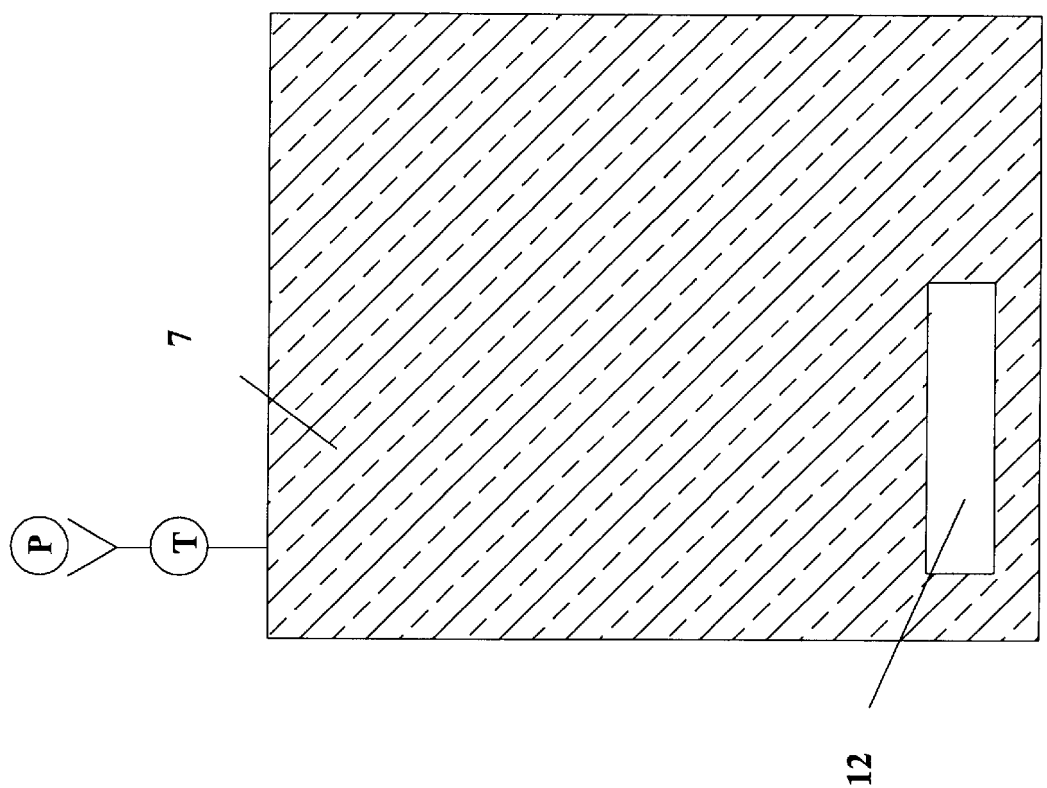
FIG. 7 illustrates the heating apparatus.

FIGS. 4 and 7 illustrate the heating jacket 7. The heating jacket of the invention disclosed herein is approximately 12 inches long and 23 inches flat. This is large enough that it can accommodate all sizes of hose. The P with a circle around it illustrated in FIGS. 4, 5, 6 and 7 is the electric power source which is responsible for providing power to heat the heating jacket 7. FIG. 7 further illustrates Velcro 12 which is used to secure and wrap the heating jacket up around the fire hose. Velcro is a registered trademark of Velcro Industries, B.V. located in the Netherlands. FIG. 4 illustrates a cross-sectional view of the heating jacket 7. Heating jacket 7 will heat the fire hose 1 to a temperature of between 270–300° F.

Figure 5:
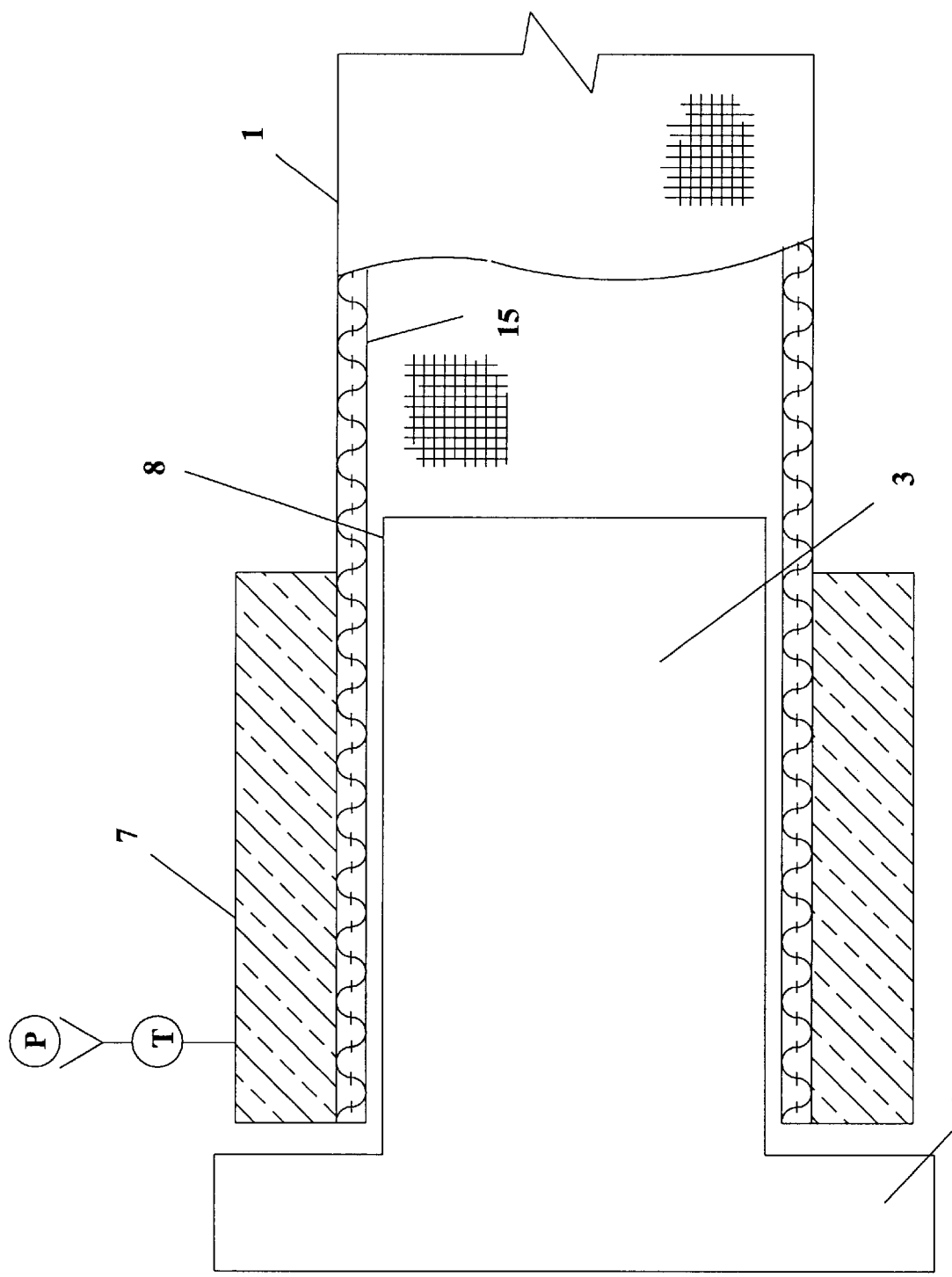
FIG. 5 illustrates a fire hose positioned about a coupling having a single diameter barrel.

FIG. 5 illustrates a coupling 3 having a flange 9. It will be noted that the coupling 3 has an exterior 8 which is of constant diameter until such point as it reaches the flange 9. FIGS. 1, 2, 2A, and 3 illustrate the hose 1 applied to the coupling 3 absent the flange 9.

Fire hose 1 is placed over the coupling 3 as illustrated in FIG. 5. Next, the heating jacket 7 is wrapped and secured around the fire hose 1. The power source as designated by the letter P in the drawing figures is activated and the fire hose 1 is heated to a temperature of 270–300° F. The heating continues as long as necessary to shrink the nylon or polyester fibers such that there is no gap between the outer surface 8 of the coupling and the inner surface 15 of the fire hose. The amount of time necessary to heat the fire hose varies upon the size and type of the fire hose. For instance, several fire hoses, in addition to containing nylon or polyester reinforcing fibers, also contain other polyurethane and rubbers. The heating time can vary between one minute and 15–20 minutes depending on the type of hose that is being shrunk-fit.

The Watt Low heater is a silicone rubber heater. The heating jacket contains a thermostat to regulate the temperature produced by the heating jacket. The T with a circle around it represents the thermostat.

FIG. 6 illustrates another type of coupling or shank 3' having a flange portion 9' and raised portions 10.

FIG. 4 illustrates the wrapping of the heating jacket 7 about the fire hose 1 in its free state. By free state it is meant that the fire hose 1 has not been placed over a coupling or a shank.

It has been discovered with this process that the burst pressure before and after shrinking the hose is approximately identical. Put another way, there is no significant depreciation of the burst pressure before and after shrinking the fire hose.

It has been discovered that for fire hose which includes nylon, polyester, or a combination of nylon and polyester, the fire hose can be shrunk fit to the outside diameter of a coupling or a shank. Particularly, the following steps comprise the shrinking process: placing a portion of the fire hose over the coupling, wrapping the outer surface of the portion of the fire hose over the coupling with a heating jacket, securing the heating jacket over the fire hose, heating the fire hose with the heating jacket to at least 270° F. until the inner surface of the fire hose over the coupling engages the outer surface of the coupling, removing the heating jacket from the fire hose and sealing the fire hose against the coupling.

An alternate method employs the same steps absent the step of placing of the fire hose over the coupling.

It will be understood to those skilled in the art that the foregoing description of the invention is exemplary only and is not intended and does not limit the claims which follow.

I claim:

1. A fire hose fitting method for fitting a reinforced fire hose to a coupling where said fire hose has an inside diameter which is larger than the outside diameter of said coupling, said fire hose includes an inner surface and an outer surface and said coupling includes an inner surface and an outer surface, comprising the steps of:

placing said hose over said coupling creating a gap between said outer surface of said coupling and said inner surface of said hose;

wrapping said fire hose with a heating apparatus;

and, heating said fire hose with said heating apparatus at a temperature of between 270–300° F. until said inner surface of said fire hose engages said outer surface of said coupling and no gap exists between said inner surface of said hose and said outer surface of said coupling.

2. A fire hose fitting method as claimed in claim 1 wherein said reinforced fire hose is a nylon reinforced fire hose.

3. A method of securing a reinforced fire hose to a coupling where said fire hose has an inside diameter which is larger than the outside diameter of said coupling, said fire hose includes an inner surface and an outer surface and said coupling includes an inner surface and an outer surface, comprising the steps of:

placing a portion of said fire hose over said coupling creating a gap between said outer surface of said coupling and said inner surface of said hose;

wrapping said outer surface of said portion of said fire hose over said coupling with a heating apparatus;

heating said fire hose with said heating apparatus to at least 270° F. until said inner surface of said fire hose over said coupling engages said outer surface of said coupling such that no gap exists between said inner surface of said hose and said outer surface of said coupling;

removing said heating apparatus from said fire hose;

and, sealing said fire hose against said coupling.

4. A fire hose fitting method as claimed in claim 3 wherein said reinforced fire hose is a nylon reinforced fire hose.

5. A fire hose fitting method for fitting a reinforced fire hose to one of a plurality of differently sized couplings where said fire hose has an inside diameter which is larger than the outside diameter of any one of said plurality of couplings, said fire hose includes an inner surface and an outer surface and said any one of said plurality of couplings includes an inner surface and an outer surface, comprising the steps of:

placing said hose over said any one of said plurality of couplings creating a gap between said outer surface of said coupling and said inner surface of said hose;

wrapping said fire hose with a heating apparatus;

and, heating said fire hose with said heating apparatus at a temperature between 270°–300° until said inner surface of said fire hose engages said outer surface of said any one of said plurality of couplings and no gap exists between said inner surface of said hose and said outer surface of said any one of said plurality of couplings.

6. A fire hose fitting method as claimed in claim 5 wherein said fire hose is a used hose which has been cycled under pressure and has an enlarged inside diameter and outside diameter.

* * * * *

UNITED STATES PATENT AND TRADEMARK OFFICE
CERTIFICATE OF CORRECTION

PATENT NO. : 6,195,865 B1
DATED : March 6, 2001
INVENTOR(S) : Michael Kirik, Jr.

It is certified that error appears in the above-identified patent and that said Letters Patent is hereby corrected as shown below:

Column 2,
Line 59, delete "soils", and insert -- sorts --.

Signed and Sealed this

Seventh Day of August, 2001

*Attest:*

NICHOLAS P. GODICI
*Attesting Officer*     *Acting Director of the United States Patent and Trademark Office*